United States Patent
Culver et al.

(10) Patent No.: US 12,061,602 B1
(45) Date of Patent: *Aug. 13, 2024

(54) FREQUENCY-BASED WORKSHEET FILTERING

(71) Applicant: SIGMA COMPUTING, INC., San Francisco, CA (US)

(72) Inventors: Carol M. Culver, Bribane, CA (US); Nipurn Doshi, Redwood City, CA (US); Diana B. Johnson, San Francisco, CA (US); Jason D. Frantz, San Francisco, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/079,316

(22) Filed: Dec. 12, 2022

Related U.S. Application Data

(63) Continuation of application No. 16/923,594, filed on Jul. 8, 2020, now Pat. No. 11,556,529.

(60) Provisional application No. 62/885,844, filed on Aug. 13, 2019.

(51) Int. Cl.
*G06F 16/00* (2019.01)
*G06F 16/2453* (2019.01)
*G06F 16/248* (2019.01)

(52) U.S. Cl.
CPC ...... *G06F 16/24534* (2019.01); *G06F 16/248* (2019.01)

(58) Field of Classification Search
CPC .............. G06F 16/24534; G06F 16/248
USPC ........................................... 707/600–899
See application file for complete search history.

(56) References Cited

U.S. PATENT DOCUMENTS

| | | | |
|---|---|---|---|
| 10,114,867 B2 | 10/2018 | Marcotte et al. | |
| 11,294,924 B1 | 4/2022 | Talbot et al. | |
| 2005/0131914 A1 | 6/2005 | Abdo et al. | |
| 2006/0026152 A1 | 2/2006 | Zeng et al. | |
| 2009/0018992 A1 | 1/2009 | Zuzarte et al. | |
| 2010/0153427 A1 | 6/2010 | Schechter et al. | |
| 2011/0191665 A1 | 8/2011 | Handsaker et al. | |
| 2011/0289088 A1 | 11/2011 | Yarin et al. | |
| 2014/0046927 A1 | 2/2014 | Nelke et al. | |
| 2015/0040049 A1 | 2/2015 | Vierich | |
| 2015/0278213 A1* | 10/2015 | Anand .............. | G06F 16/24578 707/723 |
| 2015/0378979 A1* | 12/2015 | Hirzel ..................... | G06F 40/18 715/220 |
| 2016/0012052 A1 | 1/2016 | Zoryn et al. | |
| 2016/0078070 A1* | 3/2016 | Tran .................... | G06F 16/2379 707/600 |
| 2016/0085785 A1 | 3/2016 | Hoffmann | |
| 2018/0129368 A1 | 5/2018 | Cheung et al. | |

* cited by examiner

*Primary Examiner* — Michelle N Owyang

(57) ABSTRACT

Top frequency worksheet filtering including sending a first request comprising a first search term; receiving, in response to the first request, a first plurality of distinct values having a greatest frequency in a data set and responsive to the first search term, wherein the first plurality of distinct values comprises a number of distinct values less than or equal to a size threshold; presenting the first plurality of distinct values; receiving a selection of a first value from the first plurality of distinct values; and filtering, based on the selected first value, a worksheet comprising a presentation of the data set.

20 Claims, 11 Drawing Sheets

FIG. 2

FREQUENCY-BASED WORKSHEET FILTERING

BACKGROUND

Field of the Invention

The field of the invention is data processing, or, more specifically, methods, apparatus, and products for top frequency worksheet filtering.

Description of Related Art

Modern businesses may store large amounts of data in remote databases within cloud-based data warehouses. This data may be accessed using database query languages, such as structured query language (SQL). However, some query responses may include too much data to present efficiently in a web application.

SUMMARY

Methods, systems, and apparatus for top frequency worksheet filtering. Top frequency worksheet filtering includes sending a first request comprising a first search term; receiving, in response to the first request, a first plurality of distinct values having a greatest frequency in a data set and responsive to the first search term, wherein the first plurality of distinct values comprises a number of distinct values less than or equal to a size threshold; presenting the first plurality of distinct values; receiving a selection of a first value from the first plurality of distinct values; and filtering, based on the selected first value, a worksheet comprising a presentation of the data set.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 2 sets forth a diagram of an example graphical user interface configured for top frequency worksheet filtering according to embodiments of the present invention.

DETAILED DESCRIPTION

Figure 1:
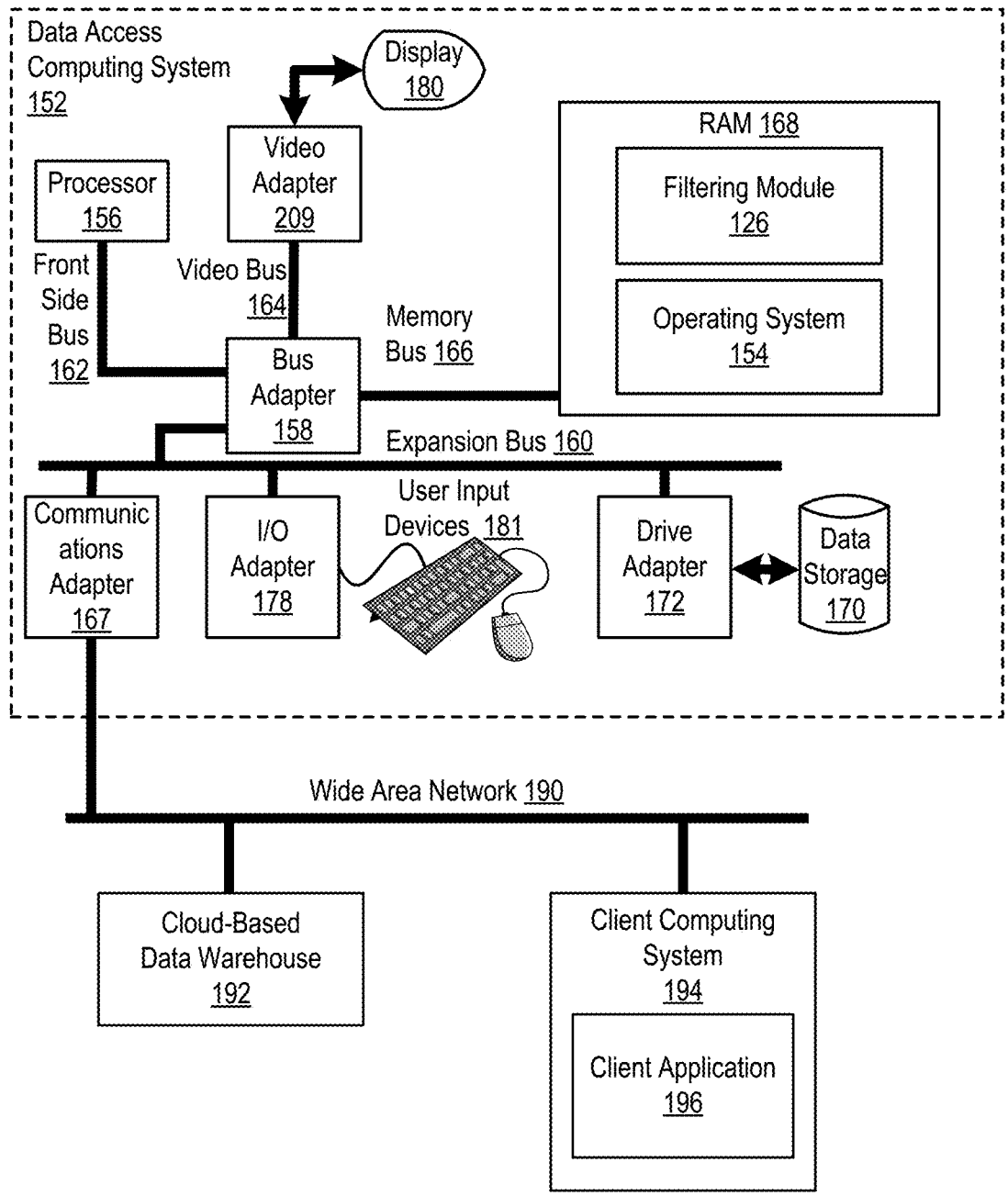
FIG. 1 sets forth a block diagram of an example system configured for top frequency worksheet filtering according to embodiments of the present invention.

Exemplary methods, apparatus, and products for top frequency worksheet filtering in accordance with the present invention are described with reference to the accompanying drawings, beginning with FIG. 1. FIG. 1 sets forth a block diagram of automated computing machinery comprising an exemplary data access computing system (152) configured for top frequency worksheet filtering according to embodiments of the present invention. The data access computing system (152) of FIG. 1 includes at least one computer processor (156) or 'CPU' as well as random access memory (168) ('RAM') which is connected through a high speed memory bus (166) and bus adapter (158) to processor (156) and to other components of the data access computing system (152).

Stored in RAM (168) is an operating system (154). Operating systems useful in computers configured for top frequency worksheet filtering according to embodiments of the present invention include UNIX™, Linux™, Microsoft Windows™, AIX™, IBM's iOS™, and others as will occur to those of skill in the art. The operating system (154) in the example of FIG. 1 is shown in RAM (168), but many components of such software typically are stored in non-volatile memory also, such as, for example, on data storage (170), such as a disk drive. Also stored in RAM is the filtering module (126), a module for top frequency worksheet filtering according to embodiments of the present invention.

The data access computing system (152) of FIG. 1 includes disk drive adapter (172) coupled through expansion bus (160) and bus adapter (158) to processor (156) and other components of the data access computing system (152). Disk drive adapter (172) connects non-volatile data storage to the data access computing system (152) in the form of data storage (170). Disk drive adapters useful in computers configured for top frequency worksheet filtering according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example data access computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example data access computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary data access computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for top frequency worksheet filtering according to embodiments of the present invention include modems for wired dial-up communications, Ethernet (IEEE 802.3) adapters for wired data communications, and 802.11 adapters for wireless data communications.

The communications adapter (167) is communicatively coupled to a wide area network (190) that also includes a cloud-based data warehouse (192) and a client computing system (194). The cloud-based data warehouse (192) is a computing system or group of computing systems that hosts a database for access over the wide area network (190). The client computing system (194) is a computing system that accesses the database via the data access computing system (152). The client computing system (194) may access the database using a client application (196), which may include a browser or a dedicated application for accessing the database via the data access computing system (152).

Figure 2:
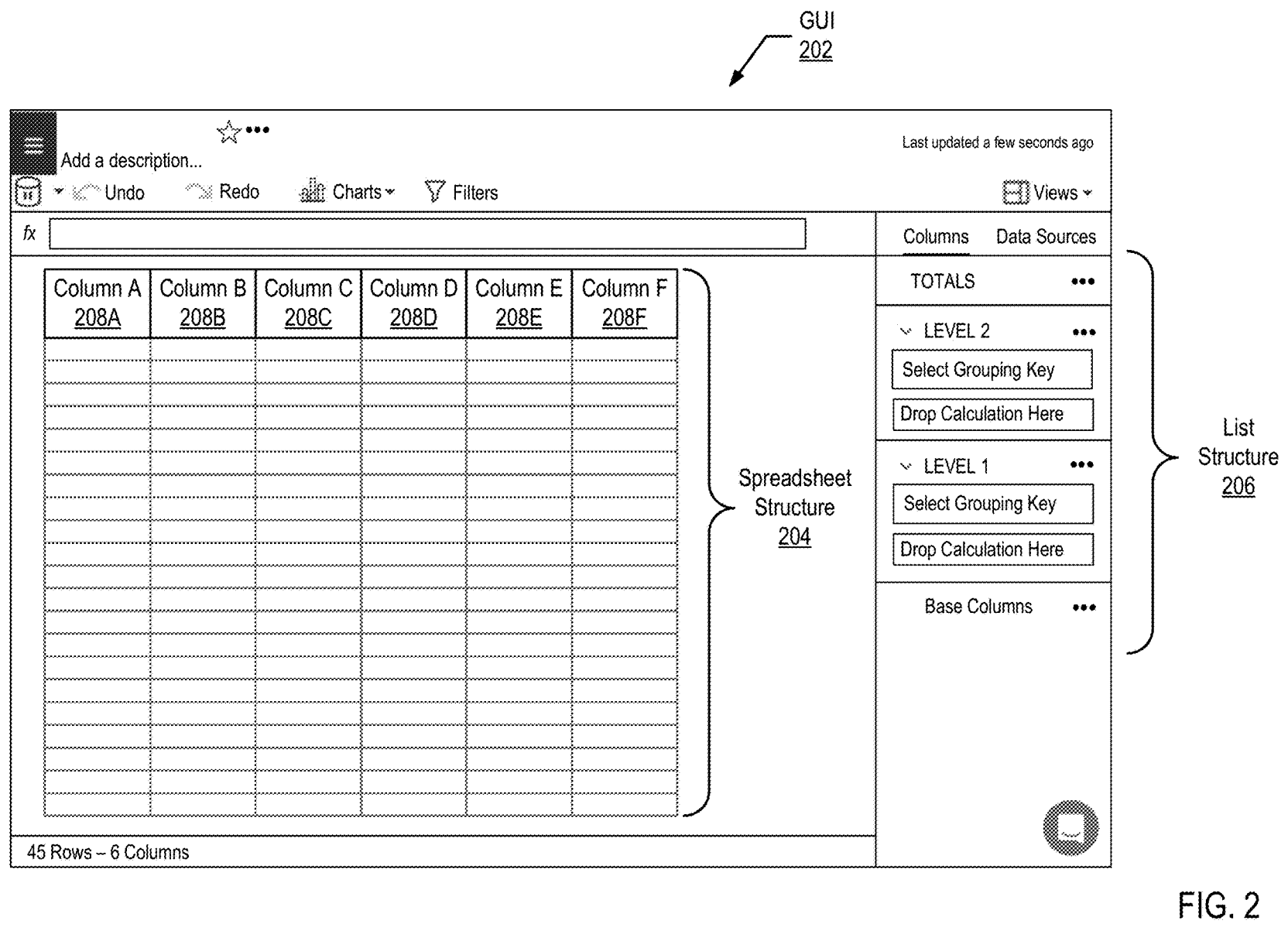

FIG. 2 shows an exemplary user interface for top frequency worksheet filtering according to embodiments of the present invention. Shown is a graphical user interface (GUI) (202). The GUI (202) is a user interface that presents a data set and graphical elements to a user and receives user input from the user. The GUI (202) may be presented, in part, by the filtering module (126) and displayed on a client computing system (194) (e.g., on a system display or mobile touchscreen). The GUI (202) may be encoded by an Internet application hosted on the data access computing system (152) for rendering by the client application (196) of the client computing system (194).

The GUI (202) presents, in part, worksheets to a user. A worksheet is a presentation of a data set from a database (206). The presentation structure of the data set may include presentation selections made by a user. The presentation structure may include the hierarchical relationship between the columns, filters applied to the data, and the manner in which the data is sorted. The presentation structure of the data set may also include the GUI visibility of particular data within the data set. GUI visibility may be altered based on filter settings of the data or on the visibility status (e.g., hidden or not hidden) of a column within the data set. The presentation structure of the data set may also include the formatting of the worksheet, such as the size of rows and columns.

The exemplary GUI (202) includes a spreadsheet structure (204) and a list structure (206). The spreadsheet structure (204) includes a data set (shown as empty rows) with six columns (column A (208A), column B (208B), column C (208C), column D (208D), column E (208E), column F (208F)).

The spreadsheet structure (204) is a graphical element and organizing mechanism for the data set. The spreadsheet structure (204) displays the data within the data set as rows of data organized by columns (column A (208A), column B (208B), column C (208C), column D (208D), column E (208E), column F (208F)). The columns delineate different categories of the data in each row of the data set. The columns may also be calculations using other columns in the data set.

The list structure (206) is a graphical element used to define and organize the hierarchical relationships between the columns (column A (208A), column B (208B), column C (208C), column D (208D), column E (208E), column F (208F)) of the data set. The term "hierarchical relationship" refers to subordinate and superior groupings of columns. For example, a database may include rows for an address book, and columns for state, county, city, and street. A data set from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The list structure (206) presents a dimensional hierarchy to the user. Specifically, the list structure (206) presents levels arranged hierarchically across at least one dimension. Each level within the list structure (206) is a position within a hierarchical relationship between columns (column A (208A), column B (208B), column C (208C), column D (208D), column E (208E), column F (208F)). The keys within the list structure (206) identify the one or more columns that are the participants in the hierarchical relationship. Each level may have more than one key.

One of the levels in the list structure (206) may be a base level. Columns selected for the base level provide data at the finest granularity. One of the levels in the list structure (206) may be a totals or root level. Columns selected for the totals level provide data at the highest granular level. For example, the totals level may include a field that calculates the sum of each row within a single column of the entire data set (i.e., not partitioned by any other column).

The GUI (202) may enable a user to drag and drop columns (column A (208A), column B (208B), column C (208C), column D (208D), column E (208E), column F (208F)) into the list structure (206). The order of the list structure (206) may specify the hierarchy of the columns relative to one another. A user may be able to drag and drop the columns in the list structure (206) at any time to redefine the hierarchical relationship between columns. The hierarchical relationship defined using the columns selected as keys in the list structure (206) may be utilized in charts such that drilling down (e.g., double click on a bar), enables a new chart to be generated based on a level lower in the hierarchy.

Figure 3:
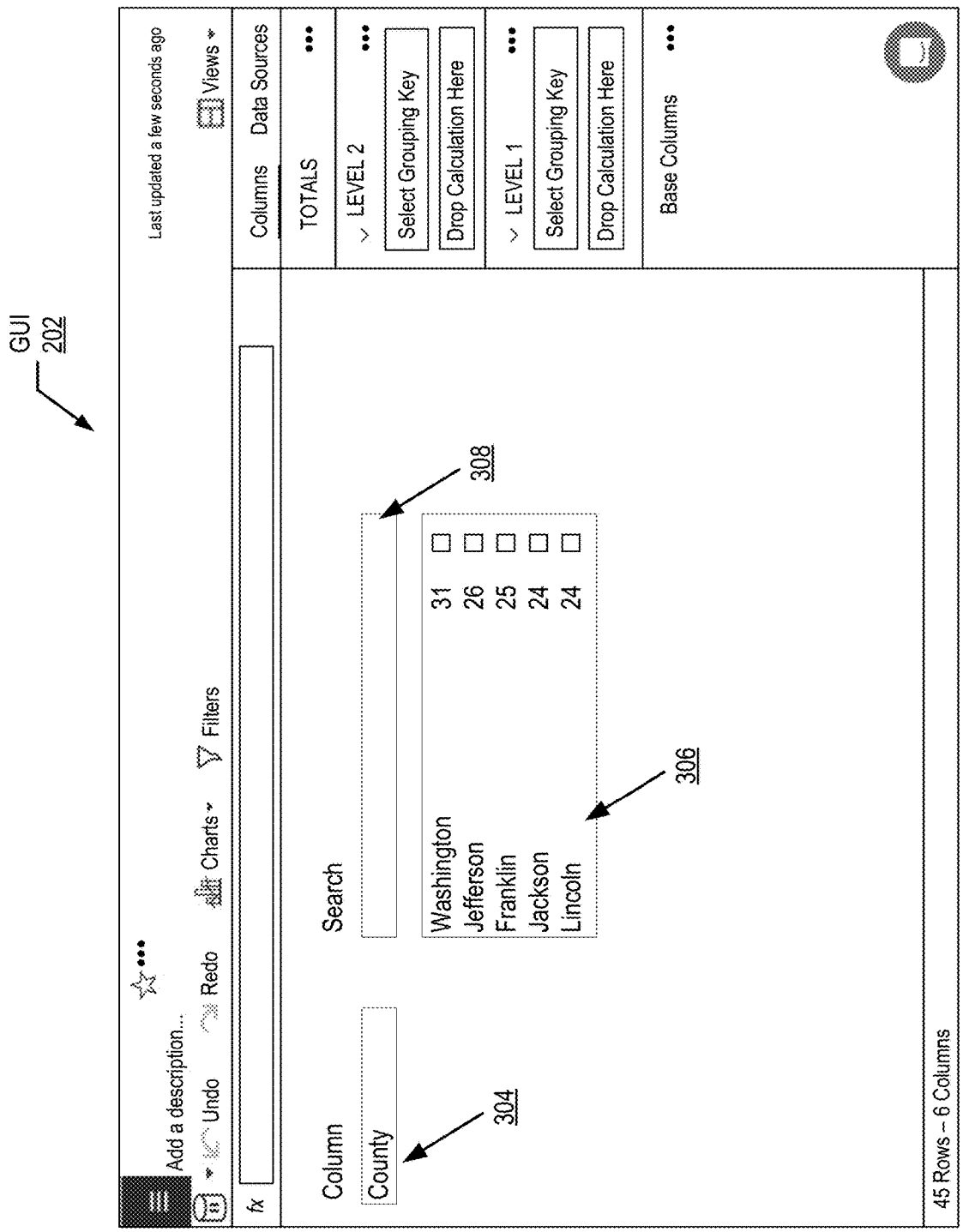
FIG. 3 sets forth a diagram of an example graphical user interface configured for top frequency worksheet filtering according to embodiments of the present invention.

FIG. 3 shows an exemplary user interface for top frequency worksheet filtering according to embodiments of the present invention. Shown is a graphical user interface (GUI) (202). The GUI (202) is a user interface that allows a user to filter a worksheet to include rows having particular values for particular columns. The GUI (202) may be presented, in part, by the filtering module (126) and displayed on a client computing system (194) (e.g., on a system display or mobile touchscreen). The GUI (202) may be encoded by an Internet application hosted on the data access computing system (152) for rendering by the client application (196) of the client computing system (194).

In this example, assume a data set for census data stored in a cloud-based data warehouse (192). Each record (e.g., row) in the data set may correspond to a particular county in the United States and have values for the following columns: county name, state name, 2000 census population, and 2010 census population. In order to more easily access desired data from the thousands of rows, a user may wish to filter a worksheet comprising a presentation of the data set. Accordingly, the GUI (202) includes a column selection (304) to select a particular column of the data set. In this example, the county name column labeled "County" has been selected.

The GUI (202) also includes a value list (306). The value list (306) presents a list of distinct values having a highest frequency of occurrence for a given column (e.g., the column selected in the column selection (304). In this example, the value list (306) presents a list of column names having a highest frequency of occurrence in the "County" column of the data set. The value list (306) may also present a count indicating a frequency to which the corresponding value occurs in the data set. For example, "Washington" has a count of 31, indicating that 31 counties in the data set are named "Washington." The number of distinct values included in the value list (306) may be limited by (e.g., is less than or equal to) a size threshold. For example, where the size threshold is 50, the value list (306) presents the top 50 values for the "County" column by frequency.

Each entry in the value list (306) also includes a checkbox allowing for a selection of a given value. In response to a selection of a value, a worksheet comprising a presentation of the data set may be filtered. For example, selection of a value may cause the client application (196) rendering the GUI (202) to send a request or command to the filtering module (126) comprising the selected value and the selected column. The filtering module (126) may then issue a database query (e.g., to the cloud-based data warehouse (192)) to select rows of the data set having the selected value for the selected column. Where multiple values are selected and included in the request, the filtering module (126) may issue a database query (e.g., to the cloud-based data warehouse (192)) to select rows of the data set having any of the selected values for the selected column. The selected rows may then be sent to the client computing system 194 for rendering by the client application (196) (e.g., in the GUI (202)).

The list of values in the value list (306) may also be responsive to a search term. A value may be considered responsive to a search term where the value begins with the search term, contains the search term, or is otherwise similar to the search term. The search term may be input to a search input (308). Here, the search input (306) is empty, and thus the search term is an empty string. Accordingly, any value including null values would be responsive to the search term.

The value list (306) may be populated in response to a selection of a column in the column selection (304), in response to opening or refreshing the GUI (202), in response to selection of a button or user interface element, in response to a modification of a search term in the search input (e.g., addition or deletion of a character), or in response to another event. Populating the value list (306) may comprise sending a request comprising the search term (e.g., in the search input 308)) to a filtering module (126). The request may also indicate a selected column to which the search term should be applied. The filtering module (126) may then issue a database query (e.g., to the cloud-based data warehouse (192)) for a plurality of distinct values in the selected column having a greatest frequency and responsive to the search term. The database query may also indicate the size threshold such that the plurality of distinct values received in response to the query comprises a number of distinct values less than or equal to the size threshold. The response to the query may also comprise counts (e.g., frequencies of occurrence) for each of the distinct values. The plurality of distinct values and/or the counts may then be provided to the client computing system (194) to populate the value list (306).

Figure 4:
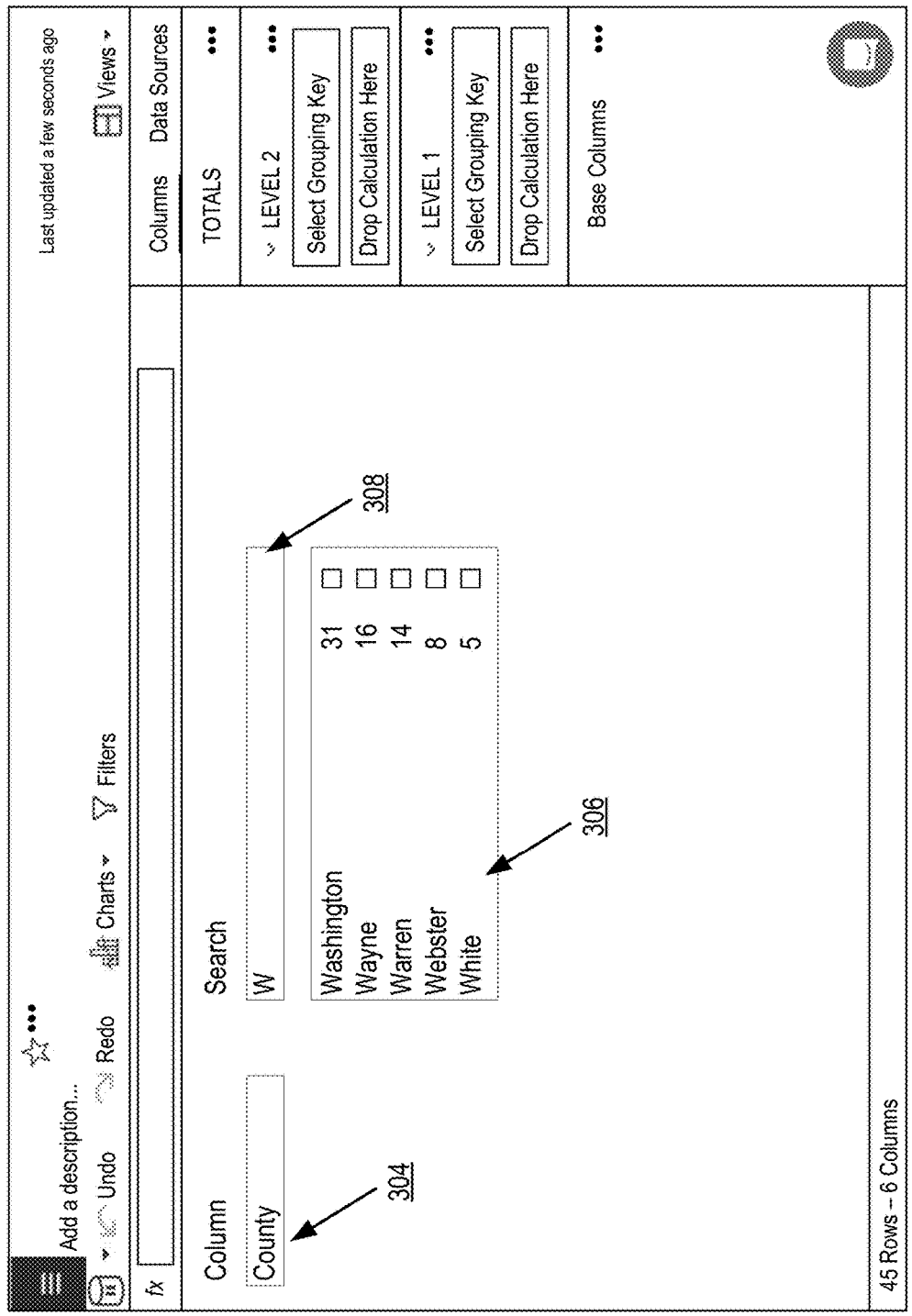
FIG. 4 sets forth a diagram of an example graphical user interface configured for top frequency worksheet filtering according to embodiments of the present invention.

FIG. 4 shows an exemplary user interface for top frequency worksheet filtering according to embodiments of the present invention. Shown is the graphical user interface (GUI) (202). Here, the search input (308) has been filled with the search term "W." Thus, the value list (306) includes those values for the "County" column beginning with "W" and having the highest frequency. As a user adds additional characters to the search term, subsequent requests comprising the search term may be provided to the filtering module (126). Whether a request is provided to the filtering module (126) may be dependent on whether responses (e.g., lists of distinct values) to the search query are stored in memory of the client computing system (194) (e.g., cache, browser cache, etc.). For example, in response to receiving a search term, it may be determined (e.g., by the client application (196)) that a response to the search term is stored in memory. The response may then be loaded from memory instead of retrieved via the filtering module (126). The distinct values in the response may then be presented (e.g., in a value list (306)).

As another example, in response to receiving a search term, it may be determined (e.g., by the client application (196)) that a response to a partial match of the search term is stored in memory. A partial match may be a string that is a substring of the search term. For example, the search term "W" is a partial match to the search term "Wa." Thus, distinct values responsive to the partial match are necessarily a superset of the distinct values responsive to the search term. In other words, the distinct values responsive to the search term are a subset of the distinct values responsive to the partial match.

Accordingly, where a number of distinct values in the response to the partial match is less than the size threshold, the distinct values responsive to the search term are stored in memory as a subset of the distinct values in the response to the partial match. The distinct values in the response to the partial match that are responsive to the search term may then be presented instead of retrieved via the filtering module (126). Where a number of distinct values in the response to the partial match is equal than the size threshold there is no guarantee that the all distinct values responsive to the search term are stored in memory. Accordingly, a request comprising the search term must then be sent to the filtering module (126) for distinct values responsive to the search term and having a greatest frequency in the data set.

Figure 5:
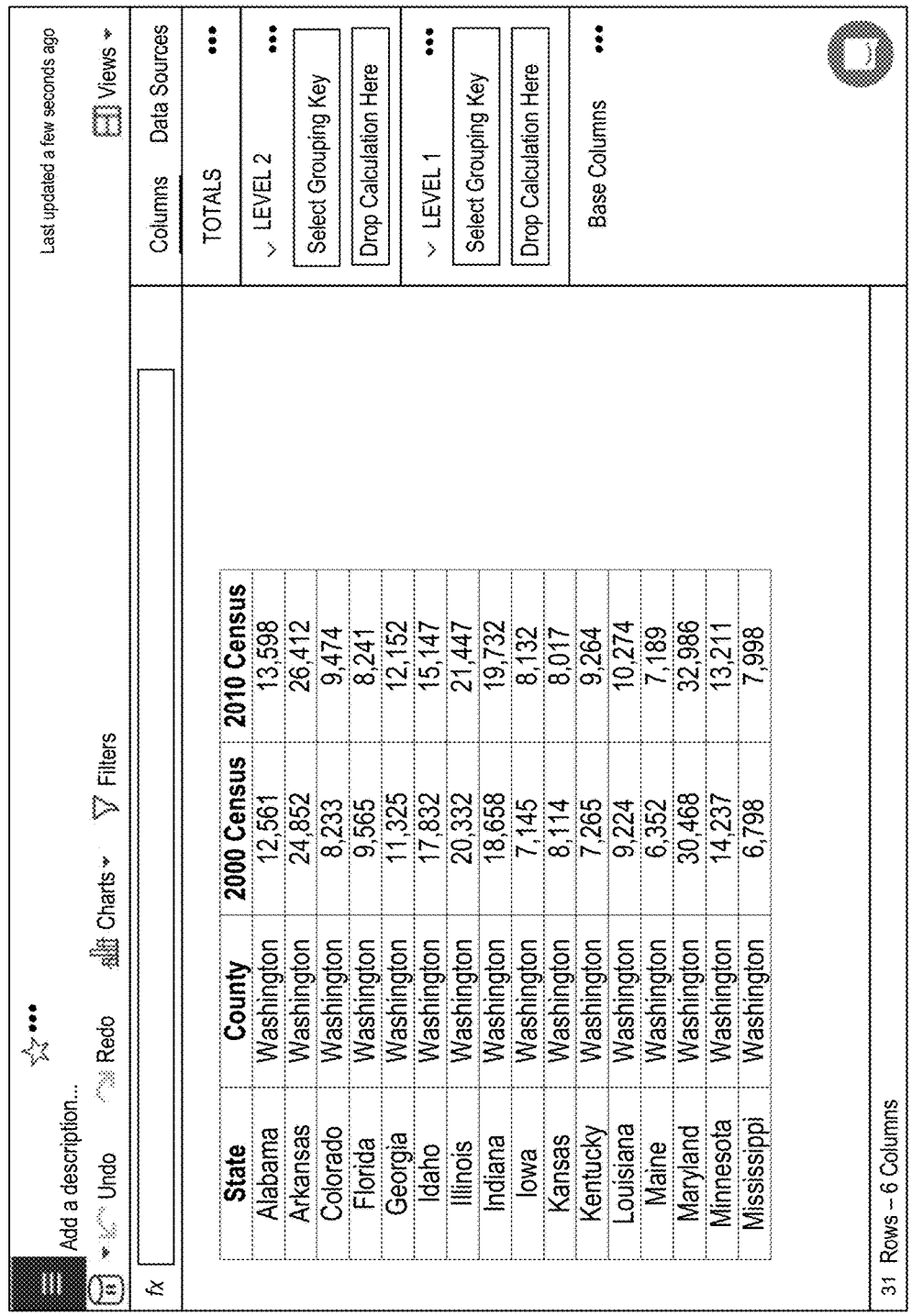
FIG. 5 sets forth a diagram of an example graphical user interface configured for top frequency worksheet filtering according to embodiments of the present invention.

FIG. 5 shows an exemplary user interface for top frequency worksheet filtering according to embodiments of the present invention. Shown is the graphical user interface (GUI) (202). Here, it is assumed that the "Washington" value was selected from the value list (306) of the GUI (202). Thus, the worksheet displays rows in the data set having a "County" value equal to "Washington." Note that additional rows of the worksheet may be hidden or below the fold, and may then be rendered in response to scrolling or otherwise navigating the worksheet. Moreover, where a data size of filtered rows is greater than a threshold (e.g., relative to browser cache or predefined), a portion of the rows may be stored by the filtering module (126) for communication to the client application (196) for rendering as a user scrolls or navigates the worksheet.

Figure 6:
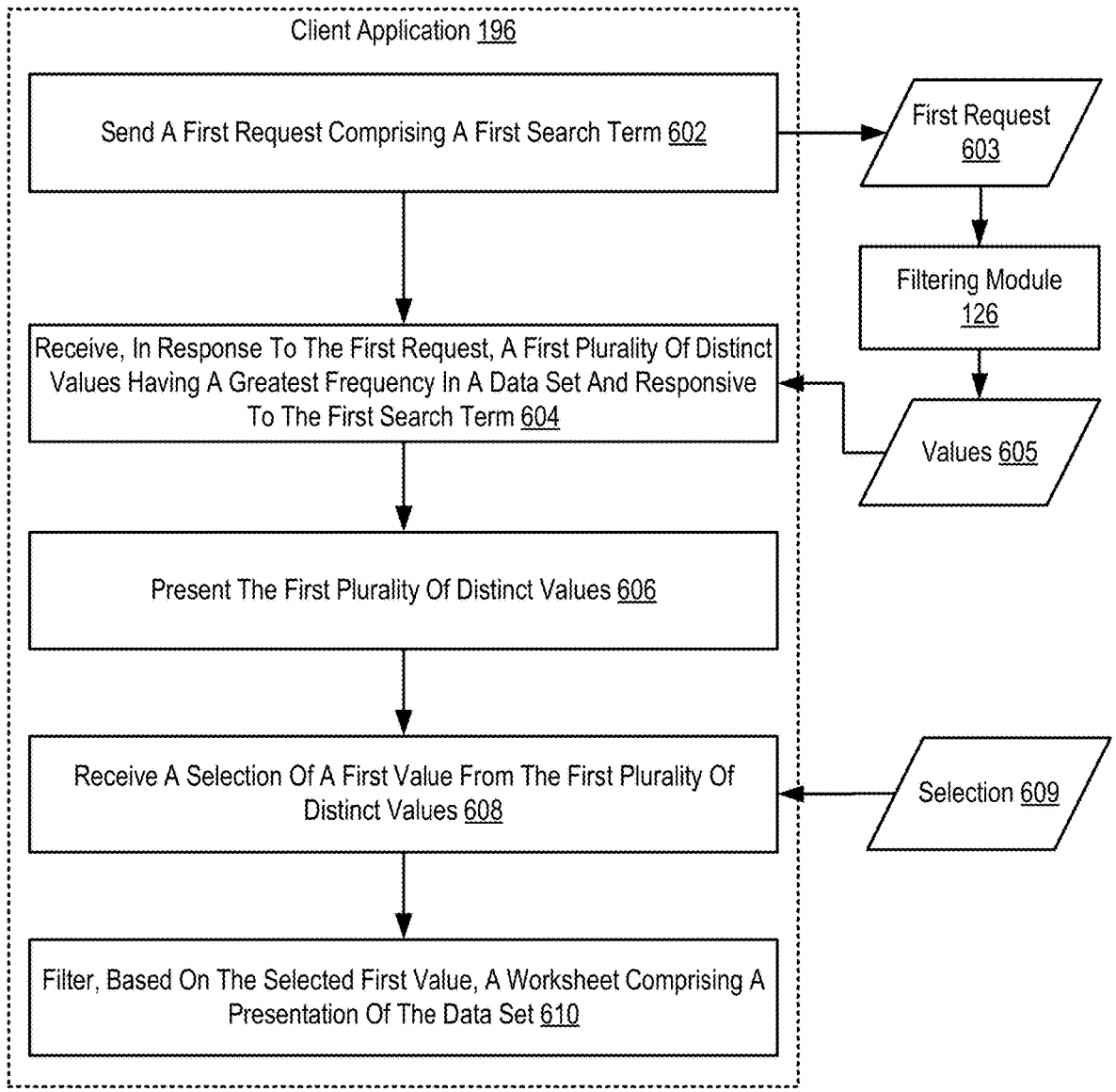
FIG. 6 sets forth a flow chart illustrating an exemplary method for top frequency worksheet filtering according to embodiments of the present invention.

For further explanation, FIG. 6 sets forth a flow chart illustrating an exemplary method for top frequency worksheet filtering according to embodiments of the present invention that includes sending (602) a first request (603) comprising a first search term. The first search term may comprise an input to a GUI (202) (e.g., an input to a search input (308)). The search term may comprise an empty string, or a string comprising one or more characters. The first request (603) may also comprise an indication of a column of a data set. The first request (603) may be sent by a client application (196) to a filtering module (126).

The method of FIG. 6 also includes receiving (604) (e.g., from the filtering module (126) by the client application (196)), in response to the first request (603), a first plurality of distinct values (605) having a greatest frequency in a data set and responsive to the first search term. For example, the filtering module (126) may, in response to the first request (603), issue a database query to the cloud-based data warehouse (192) for the first plurality of distinct values (605) and send the first plurality of distinct values (605) to the client application (196).

The first plurality of distinct values (605) comprise those values having a greatest frequency of occurrence in a given column (e.g., a selected column indicated in the first request (603), a column selected via a column selection (304) of the GUI (202)). The number of distinct values (605) in the first plurality of distinct values (605) may be less than or equal to a size threshold. The size threshold may be specified in the first request (603) or comprise a default value. Receiving the first plurality of distinct values (605) may also comprise receiving, for each value in the plurality of distinct values (605), a count indicating a number of rows in the data set having the corresponding value (605) in the given column. The first plurality of distinct values (605) are responsive to the first search term. A value may be considered responsive to a search term where the value begins with the search term, contains the search term, or is otherwise similar to the search term. Where the search term is a null string, any value including null values would be responsive to the search term.

The method of FIG. 6 further comprises presenting (606) the first plurality of distinct values (606). The first plurality of distinct values (606) may be presented by the client application (196) via a GUI (202) (e.g., in a values list (306)). For each value (605), a count indicating a number of rows in the data set having the corresponding value (605) in the given column may also be presented. Additionally, for each value (605), a check box, button, or other user interface element may be presented to facilitate a selection of the corresponding value (605).

The method of FIG. 6 further comprises receiving (608) a selection (609) of a first value (605) from the first plurality of distinct values (605). The selection (609) may be received via the GUI (202) in response to a selection of a user interface element corresponding to the selected value (605). The method of FIG. 6 further comprises filtering (610), based on the selected first value, a worksheet comprising a presentation of the data set. For example, selection of a value (605) may cause the client application (196) rendering the GUI (202) to send a request or command to the filtering module (126) comprising the selected value and the selected column. The filtering module (126) may then issue a database query (e.g., to the cloud-based data warehouse (192)) to select rows of the data set having the selected value for the selected column. The selected rows may then be sent to the client computing system 194 for rendering by the client application (196) (e.g., in the GUI (202)).

Figure 7:
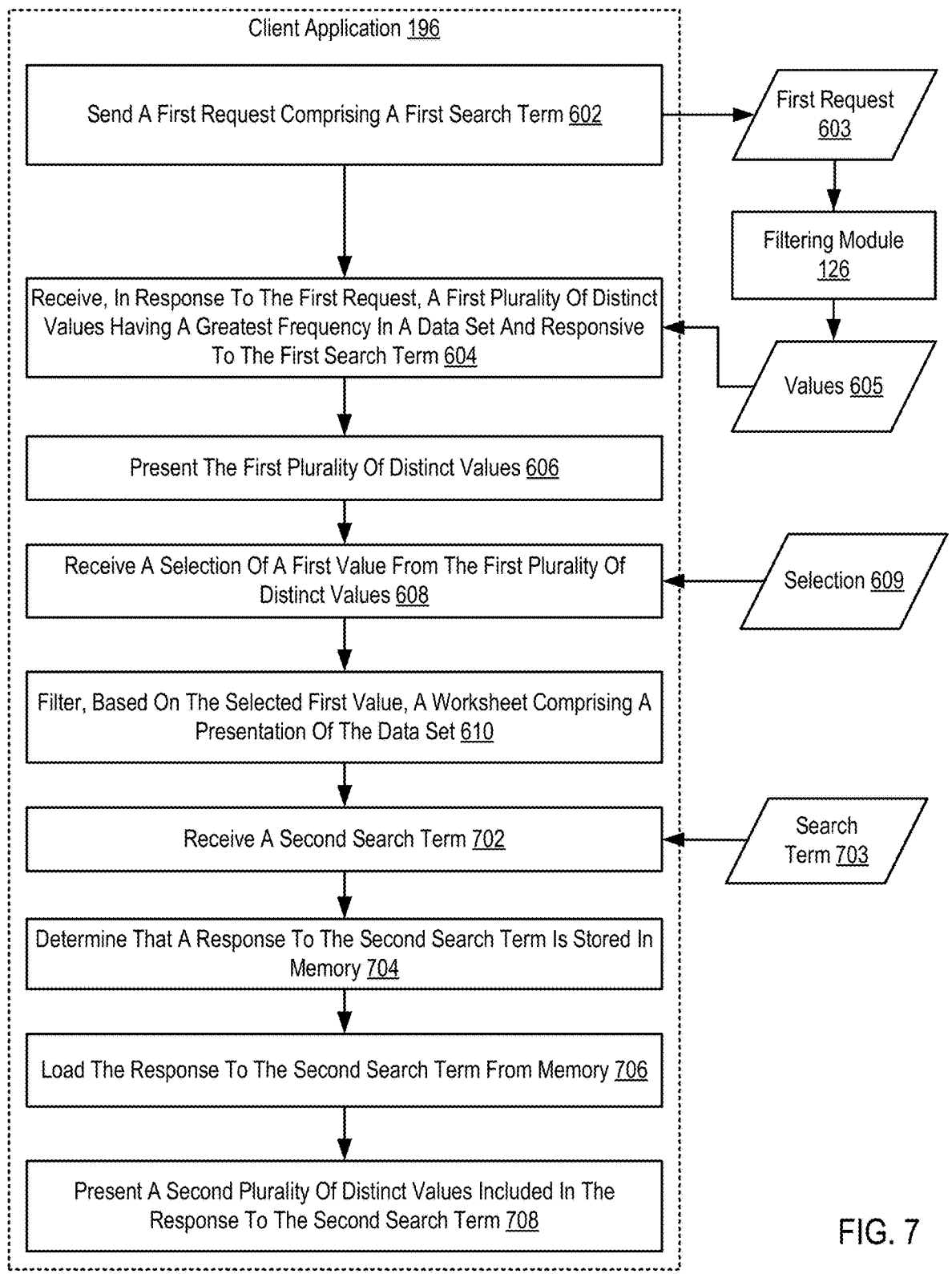
FIG. 7 sets forth a flow chart illustrating an exemplary method for top frequency worksheet filtering according to embodiments of the present invention.

For further explanation, FIG. 7 sets forth a flow chart illustrating an exemplary method for top frequency worksheet filtering according to embodiments of the present invention that includes sending (602) a first request (603) comprising a first search term; receiving (604), in response to the first request, a first plurality of distinct values (605) having a greatest frequency in the data set and responsive to the first search term; presenting (606) the first plurality of distinct values (605); receiving (608) a selection of a first value (605) from the first plurality of distinct values (605); and filtering (610), based on the selected first value (605), a worksheet comprising a presentation of the data set.

The method of FIG. 7 differs from FIG. 6 in that the method of FIG. 7 further comprises receiving (702) a second search term (703). The second search term (703) may be received via a search input (308) of the GUI (202). For example, as each character is entered into the search input (308), a search term (703) may be considered entered. The method of FIG. 7 further comprises determining (704) that a response to the second search term (703) is stored in memory (e.g., memory of the client computing system (194), cache memory, browser cache). In other words, the second search term (703) was previously submitted to the filtering module (126), and the stored response comprises a second plurality of distinct values.

The method of FIG. 7 further differs from FIG. 6 in that the method of FIG. 7 further comprises loading (706) the response to the second search term (703) from memory. As the response to the second search term (703) is stored in memory, the client application (196) can load the response from memory instead of sending a request to the filtering module (126). The response may be loaded in response to a predefined condition. For example, if the response was received and/or stored before a time threshold, the client application (196) may treat the stored response as outdated or invalid and instead send a request to the filtering module (126).

The method of FIG. 7 further differs from FIG. 6 in that the method of FIG. 7 further comprises presenting (708) the second plurality of distinct values included in the response to the second search term (703) (e.g., loaded from memory). For example, a values list (306) may be populated with the second plurality of distinct values loaded from memory.

Figure 8:
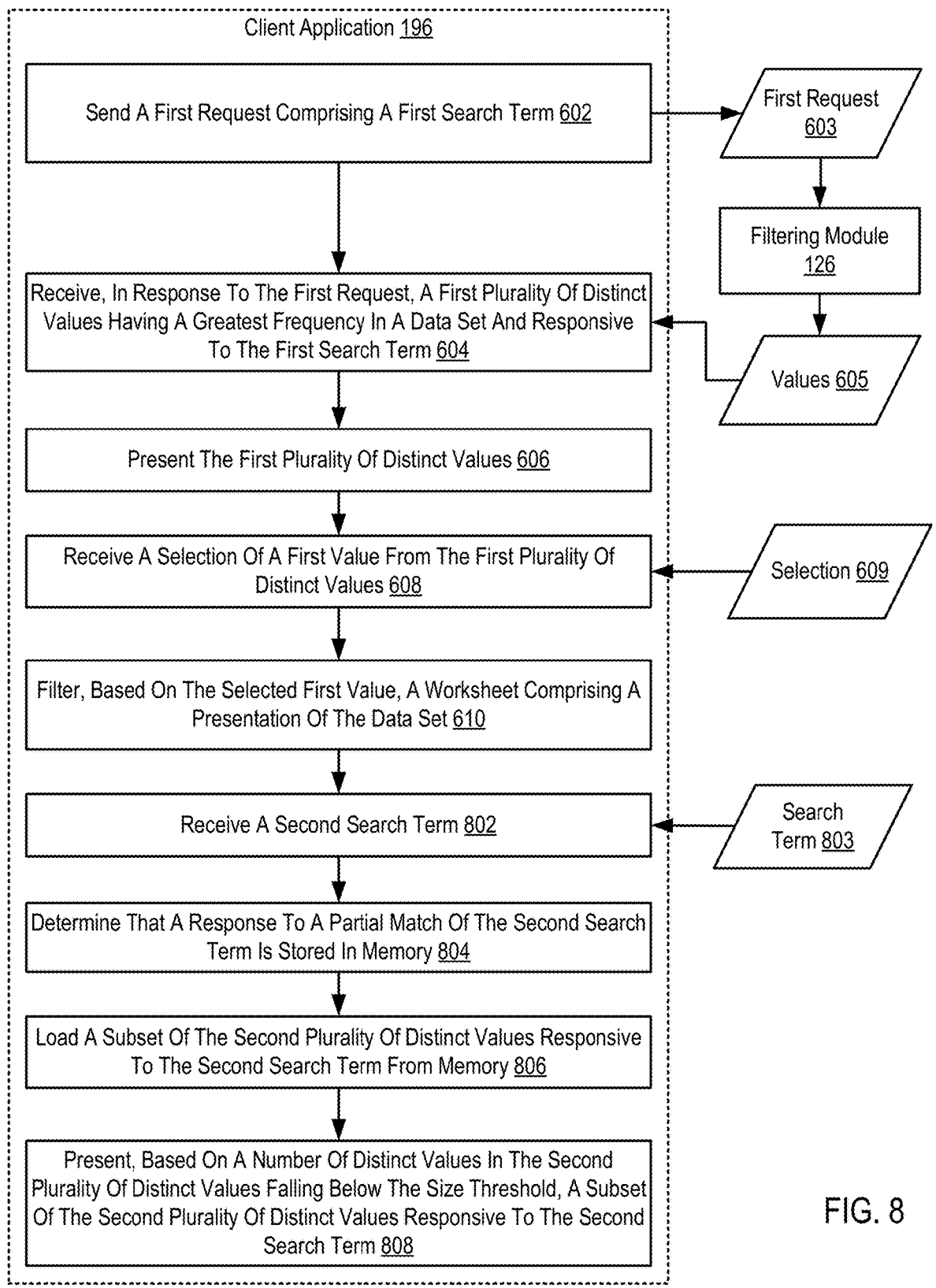
FIG. 8 sets forth a flow chart illustrating an exemplary method for top frequency worksheet filtering according to embodiments of the present invention.

For further explanation, FIG. 8 sets forth a flow chart illustrating an exemplary method for top frequency worksheet filtering according to embodiments of the present invention that includes sending (602) a first request (603) comprising a first search term; receiving (604), in response to the first request, a first plurality of distinct values (605) having a greatest frequency in the data set and responsive to the first search term; presenting (606) the first plurality of distinct values (605); receiving (608) a selection of a first value (605) from the first plurality of distinct values (605); and filtering (610), based on the selected first value (605), a worksheet comprising a presentation of the data set.

The method of FIG. 8 differs from FIG. 6 in that the method of FIG. 8 further comprises receiving (802) a second search term (803). The second search term (803) may be received via a search input (308) of the GUI (202). For example, as each character is entered into the search input (308), a search term (803) may be considered entered. The method of FIG. 8 further comprises determining (804) that a response to a partial match the second search term (803) is stored in memory (e.g., memory of the client computing system (194), cache memory, browser cache). A partial match of the second search term (803) may be a string that is a substring of the second search term (803). For example, the search term "W" is a partial match to the search term "Wa." Thus, distinct values responsive to the partial match are necessarily a superset of the distinct values responsive to the search term. In other words, the distinct values responsive to the search term are a subset of the distinct values responsive to the partial match.

The response to the partial match of the second search term may comprise a second plurality of distinct values. Accordingly, the method of FIG. 8 further differs from FIG. 6 in that the method of FIG. 8 further comprises loading (806) a subset of the second plurality of distinct values responsive to the second search term (603). The method of FIG. 8 further differs from FIG. 6 in that the method of FIG. 8 further comprises presenting (808), based on a number of distinct values in the second plurality of distinct values (e.g., the response to the partial match) falling below the size threshold, the subset of the second plurality of distinct values responsive to the search term (803).

Figure 9:
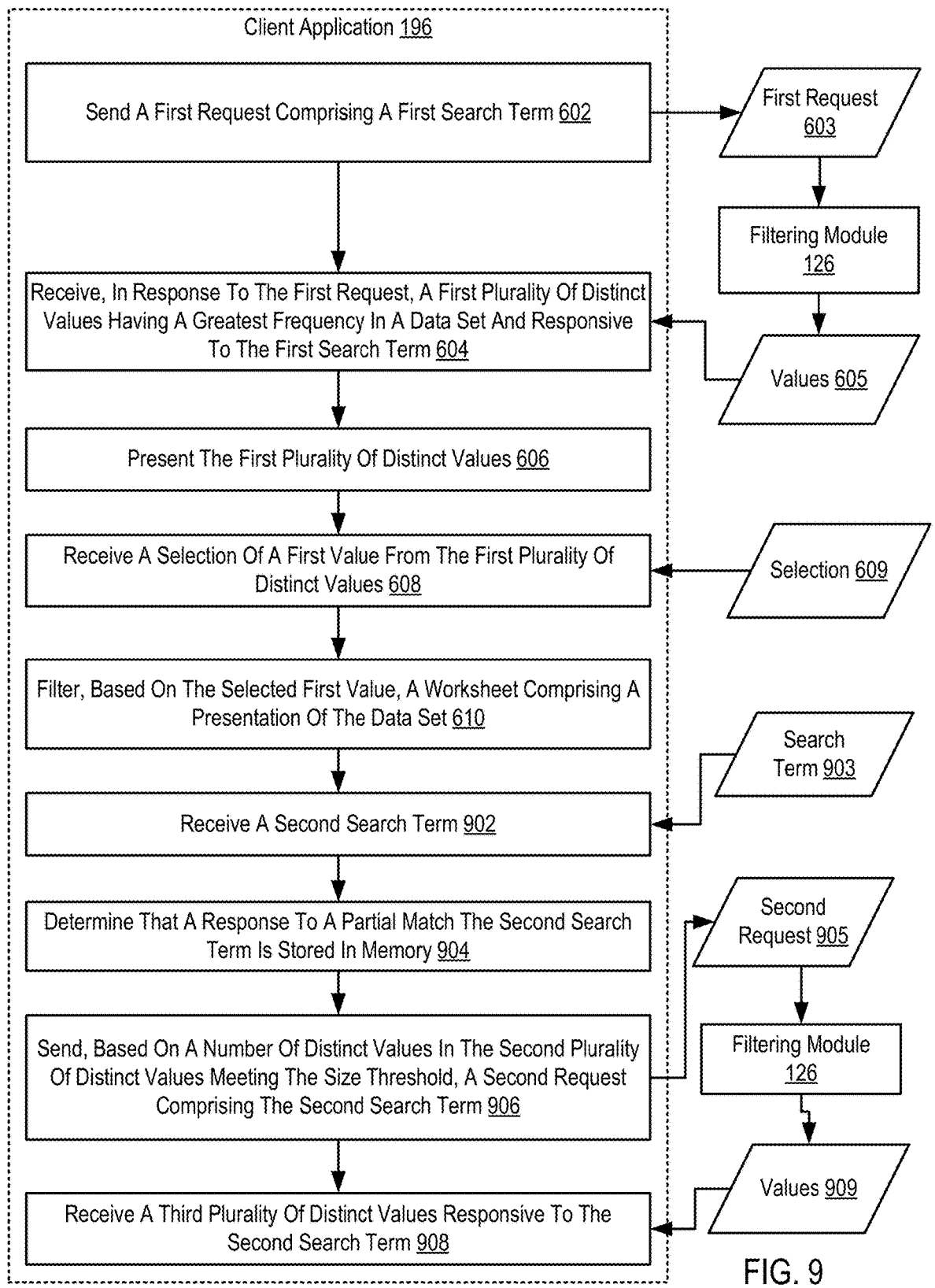
FIG. 9 sets forth a flow chart illustrating an exemplary method for top frequency worksheet filtering according to embodiments of the present invention.

For further explanation, FIG. 9 sets forth a flow chart illustrating an exemplary method for top frequency worksheet filtering according to embodiments of the present invention that includes sending (602) a first request (603) comprising a first search term; receiving (604), in response to the first request, a first plurality of distinct values (605) having a greatest frequency in the data set and responsive to the first search term; presenting (606) the first plurality of distinct values (605); receiving (608) a selection of a first value (605) from the first plurality of distinct values (605); and filtering (610), based on the selected first value (605), a worksheet comprising a presentation of the data set.

The method of FIG. 9 differs from FIG. 6 in that the method of FIG. 9 further comprises receiving (902) a second search term (903). The second search term (903) may be received via a search input (308) of the GUI (202). For example, as each character is entered into the search input (308), a search term (903) may be considered entered. The method of FIG. 8 further comprises determining (904) that a response to a partial match the second search term (803) is stored in memory (e.g., memory of the client computing system (194), cache memory, browser cache).

The response to the partial match of the second search term may comprise a second plurality of distinct values. Where a number of distinct values in the response to the partial match is equal than the size threshold there is no guarantee that the all distinct values responsive to the second search term (703) are stored in memory. Accordingly, the method of FIG. 9 further differs from FIG. 6 in that the method of FIG. 9 further comprises sending (906), based on a number of distinct values in the second plurality of distinct values meeting the size threshold, a second request (905) comprising the second search term (903). The second request (905) may be sent to the filtering module (126). The second request (905) may cause the filtering module (126) to issue a database query to the cloud-based data warehouse (192) for a third plurality of distinct values (909) having a highest frequency in the given column and responsive to the second search term (903). The number of distinct values (909) in the third plurality of distinct values (909) may be less than or equal to the size threshold. The filtering module (126) may then send the third plurality of distinct values (909) to the client application (196). Accordingly, the method of FIG. 9 further comprises receiving (908) the third plurality of distinct values (909) (e.g., from the filtering module (126)).

Figure 10:
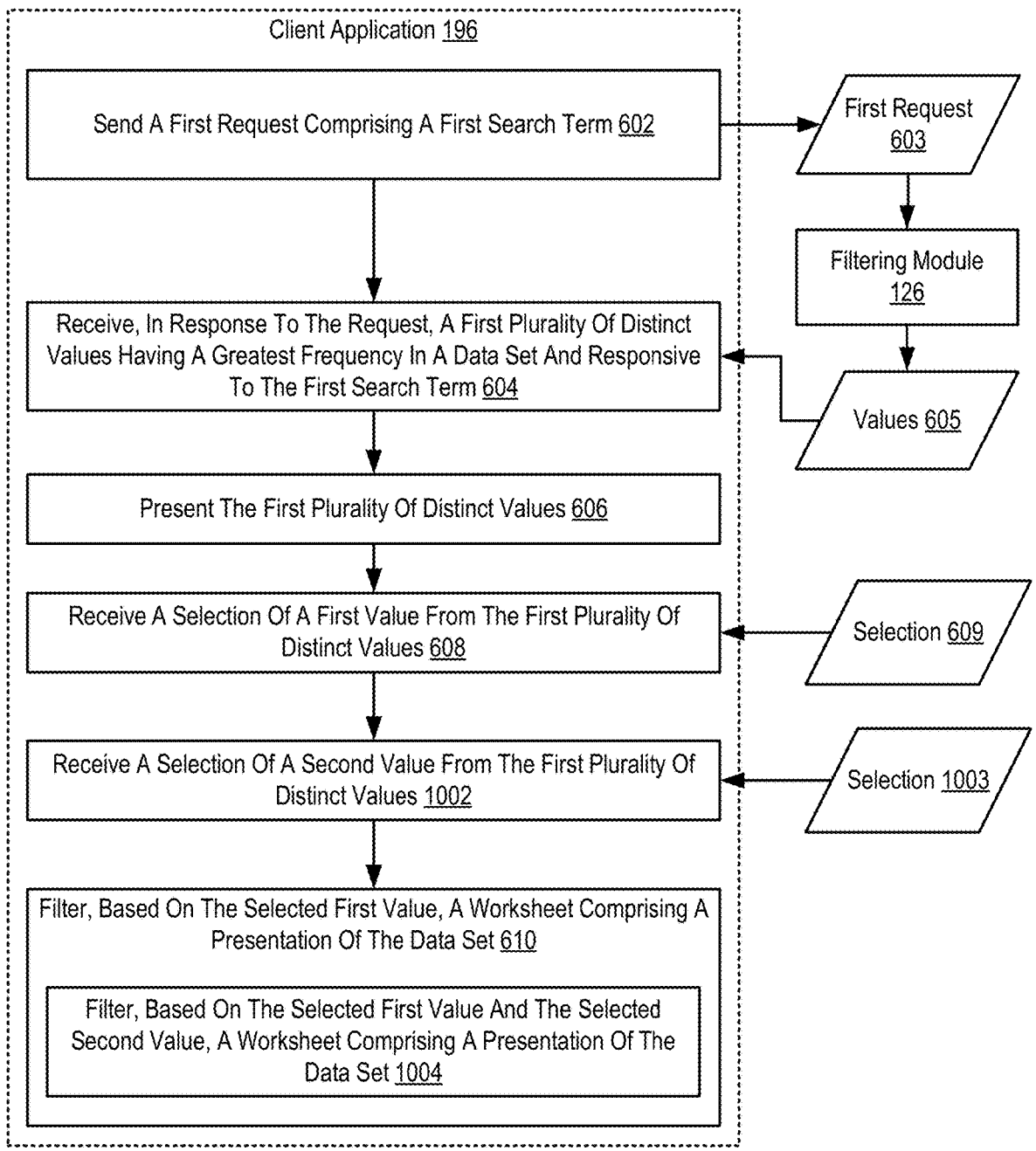
FIG. 10 sets forth a flow chart illustrating an exemplary method for top frequency worksheet filtering according to embodiments of the present invention.

For further explanation, FIG. 10 sets forth a flow chart illustrating an exemplary method for top frequency worksheet filtering according to embodiments of the present invention that includes sending (602) a first request (603) comprising a first search term; receiving (604), in response to the first request, a first plurality of distinct values (605) having a greatest frequency in the data set and responsive to the first search term; presenting (606) the first plurality of distinct values (605); receiving (608) a selection of a first value (605) from the first plurality of distinct values (605); and filtering (610), based on the selected first value (605), a worksheet comprising a presentation of the data set.

The method of FIG. 10 differs from FIG. 6 in that the method of FIG. 10 further comprises receiving (1002) a selection (1003) of a second value (605) of the first plurality of distinct values (605). The selection (1002) may be received via the GUI (202) in response to a selection of a user interface element corresponding to the selected second value (605). The method of FIG. 10 further differs from FIG. 6 in that filtering (610), based on the selected first value, a worksheet comprising a presentation of the data set comprises filtering (1004), based on the selected first value (605) and the selected second value (605), a worksheet comprising a presentation of the data set. For example, selection of the first and second value (605) may cause the client application (196) rendering the GUI (202) to send a request or command to the filtering module (126) comprising the first and second selected values (605) and the given column. The filtering module (126) may then issue a database query (e.g., to the cloud-based data warehouse (192)) to select rows of the data set having either the first selected value or the second selected value for the given column. The selected rows may then be sent to the client computing system 194 for rendering by the client application (196) (e.g., in the GUI (202)).

Figure 11:
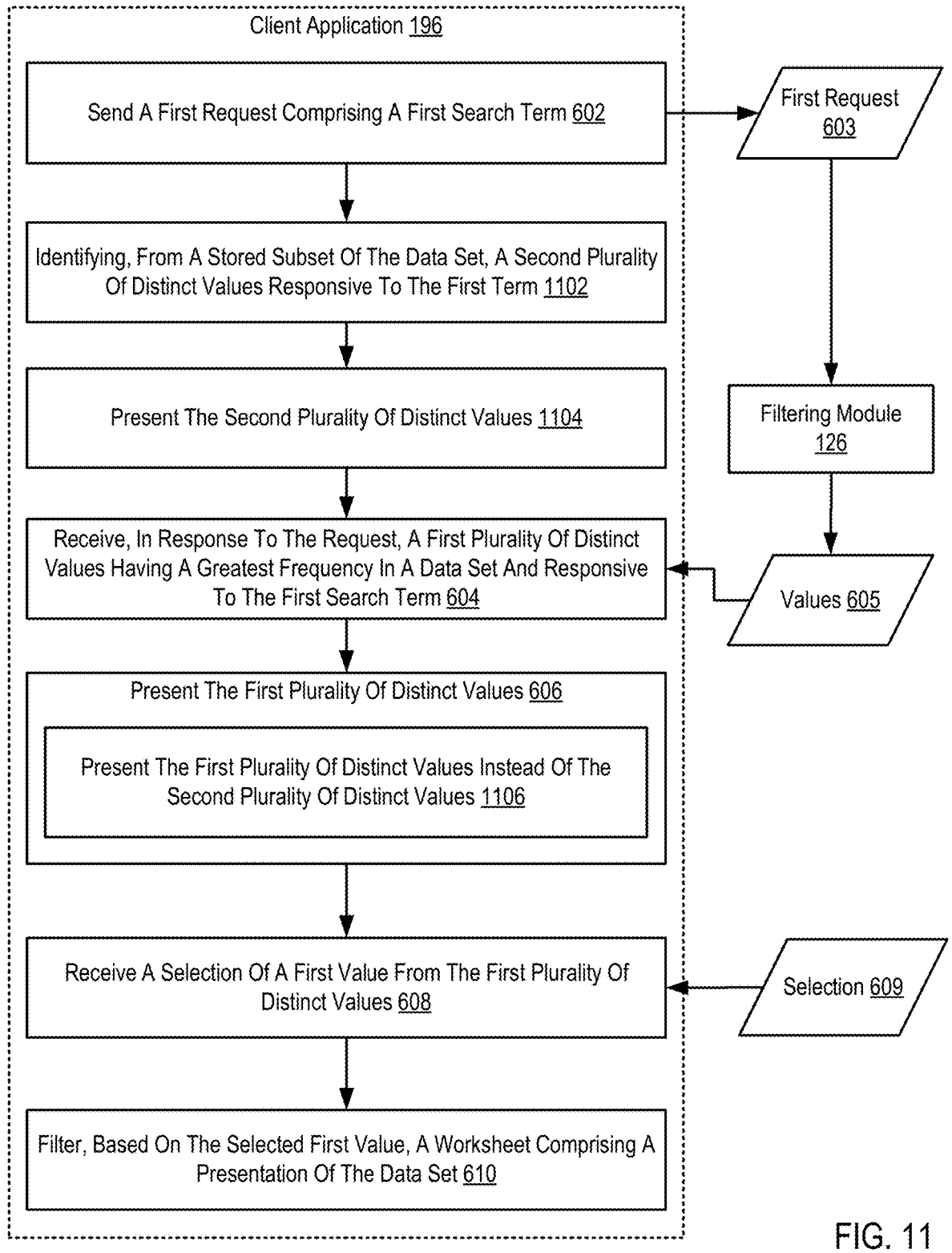
FIG. 11 sets forth a flow chart illustrating an exemplary method for top frequency worksheet filtering according to embodiments of the present invention.

For further explanation, FIG. 11 sets forth a flow chart illustrating an exemplary method for top frequency worksheet filtering according to embodiments of the present invention that includes sending (602) a first request (603) comprising a first search term; receiving (604), in response to the first request, a first plurality of distinct values (605) having a greatest frequency in the data set and responsive to the first search term; presenting (606) the first plurality of distinct values (605); receiving (608) a selection of a first value (605) from the first plurality of distinct values (605); and filtering (610), based on the selected first value (605), a worksheet comprising a presentation of the data set.

The method of FIG. 11 differs from FIG. 6 in that the method of FIG. 11 further comprises identifying (1102), from a stored subset of the data set, a second plurality of distinct values responsive to the first search term. The subset of the data set may be cached or stored in response to interacting with the database via the client application (196). Identifying (1102) the second plurality of distinct values responsive to the first search term may comprise identifying the second plurality of distinct values as having a greatest frequency of occurrence in a given row of the stored subset of the data set. The method of FIG. 11 differs from FIG. 6 in that the method of FIG. 11 further comprises presenting (1104) the second plurality of distinct values (e.g., in the GUI (202)). Presenting (1104) the second plurality of distinct values may be performed as the client application (196) is waiting on a response to the first request (603). The method of FIG. 11 differs from FIG. 6 in that presenting (606) the first plurality of distinct values comprises presenting (1106) the first plurality of distinct values (e.g., values based on data stored in the cloud-based data warehouse (192)) instead of the second plurality of distinct values (e.g., values based on locally stored data).

In view of the explanations set forth above, readers will recognize that the benefits of top frequency worksheet filtering according to embodiments of the present invention include:

Improving the operation of a computing system by allowing for filtering of remotely disposed data based on selected frequently occurring values.

Improving the operation of a computing system by selectively querying cloud-based data warehouses based on the state of locally stored data.

Exemplary embodiments of the present invention are described largely in the context of a fully functional computer system for top frequency worksheet filtering. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
   receiving a first plurality of distinct values having a greatest frequency of occurrence in a data set and responsive to submitting a first search term and column indication, wherein the first plurality of distinct values comprises a number of distinct values less than or equal to a size threshold;
   receiving, via a graphical user interface, a selection of a first value from the first plurality of distinct values; and
   filtering, based on the selected first value, a worksheet, wherein the worksheet comprises a presentation of the data set.

2. The method of claim 1, wherein filtering, based on the selected value, the worksheet comprises:
   causing a database query based on the selected first value to be issued to a database storing the data set, wherein the database is within a cloud-based data warehouse; and
   receiving a subset of the data set responsive to the database query.

3. The method of claim 1, further comprising:
   receiving a second search term;
   determining that a response to the second search term is stored;
   loading the response to the second search term; and
   presenting a second plurality of distinct values included in the response to the second search term.

4. The method of claim 1, further comprising:
   receiving a second search term;
   determining that a response to a partial match of the second search term is stored, the response to the partial match comprising a second plurality of distinct values;
   loading a subset of the second plurality of distinct values responsive to the second search term; and
   presenting, based on a number of distinct values in the second plurality of distinct values falling below the size threshold, the subset of the second plurality of distinct values responsive to the second search term.

5. The method of claim 1, further comprising:
   receiving a second search term;
   determining that a response to a partial match of the second search term is stored in memory, the response to the partial match of the second search term comprising a second plurality of distinct values;
   sending, based on a number of distinct values in the second plurality of distinct values meeting the size threshold, a request comprising the second search term; and
   receiving, in response to the request, a third plurality of distinct values having a greatest frequency in the data set and responsive to the second search term.

6. The method of claim 1, further comprising:
   receiving a selection of a second value from the first plurality of distinct values,
   wherein filtering, based on the first selected value, the worksheet comprises filtering, based on the selected first value and the selected second value, the worksheet.

7. The method of claim 1, further comprising:
   identifying, from a stored subset of the data set, a second plurality of distinct values responsive to the first search term; and
   presenting the second plurality of distinct values,
   wherein presenting the first plurality of distinct values comprises presenting the first plurality of distinct values instead of the second plurality of distinct values.

8. An apparatus comprising a computer processor, a computer memory operatively coupled to the computer processor, the computer memory having disposed within it computer program instructions that, when executed by the computer processor, cause the apparatus to carry out the steps of:
   receiving a first plurality of distinct values having a greatest frequency of occurrence in a data set and responsive to submitting a first search term and column indication, wherein the first plurality of distinct values comprises a number of distinct values less than or equal to a size threshold;
   receiving, via a graphical user interface, a selection of a first value from the first plurality of distinct values; and
   filtering, based on the selected first value, a worksheet, wherein the worksheet comprises a presentation of the data set.

9. The apparatus of claim 8, wherein filtering, based on the selected value, the worksheet comprises:
   causing a database query based on the selected first value to be issued to a database storing the data set, wherein the database is within a cloud-based data warehouse; and
   receiving a subset of the data set responsive to the database query.

10. The apparatus of claim 8, wherein the steps further comprise:
    receiving a second search term;
    determining that a response to the second search term is stored;
    loading the response to the second search term; and
    presenting a second plurality of distinct values included in the response to the second search term.

11. The apparatus of claim 8, wherein the steps further comprise:
receiving a second search term;
determining that a response to a partial match of the second search term is stored, the response to the partial match comprising a second plurality of distinct values;
loading a subset of the second plurality of distinct values responsive to the second search term; and
presenting, based on a number of distinct values in the second plurality of distinct values falling below the size threshold, the subset of the second plurality of distinct values responsive to the second search term.

12. The apparatus of claim 8, wherein the steps further comprise:
receiving a second search term;
determining that a response to a partial match of the second search term is stored in memory, the response to the partial match of the second search term comprising a second plurality of distinct values;
sending, based on a number of distinct values in the second plurality of distinct values meeting the size threshold, a request comprising the second search term; and
receiving, in response to the request, a third plurality of distinct values having a greatest frequency in the data set and responsive to the second search term.

13. The apparatus of claim 8, wherein the steps further comprise:
receiving a selection of a second value from the first plurality of distinct values,
wherein filtering, based on the first selected value, the worksheet comprises filtering, based on the selected first value and the selected second value, the worksheet.

14. The apparatus of claim 8, wherein the steps further comprise:
identifying, from a stored subset of the data set, a second plurality of distinct values responsive to the first search term; and
presenting the second plurality of distinct values,
wherein presenting the first plurality of distinct values comprises presenting the first plurality of distinct values instead of the second plurality of distinct values.

15. A computer program product comprising a non-transitory computer readable medium and computer program instructions stored therein that, when executed, cause a computer to carry out the steps of:
receiving a first plurality of distinct values having a greatest frequency of occurrence in a data set and responsive to submitting a first search term and column indication, wherein the first plurality of distinct values comprises a number of distinct values less than or equal to a size threshold;
receiving, via a graphical user interface, a selection of a first value from the first plurality of distinct values; and
filtering, based on the selected first value, a worksheet, wherein the worksheet comprises a presentation of the data set.

16. The computer program product of claim 15, wherein filtering, based on the selected value, the worksheet comprises:
causing a database query based on the selected first value to be issued to a database storing the data set, wherein the database is within a cloud-based data warehouse; and
receiving a subset of the data set responsive to the database query.

17. The computer program product of claim 15, wherein the steps further comprise:
receiving a second search term;
determining that a response to the second search term is stored;
loading the response to the second search term; and
presenting a second plurality of distinct values included in the response to the second search term.

18. The computer program product of claim 15, wherein the steps further comprise:
receiving a second search term;
determining that a response to a partial match of the second search term is stored, the response to the partial match comprising a second plurality of distinct values;
loading a subset of the second plurality of distinct values responsive to the second search term; and
presenting, based on a number of distinct values in the second plurality of distinct values falling below the size threshold, the subset of the second plurality of distinct values responsive to the second search term.

19. The computer program product of claim 15, wherein the steps further comprise:
receiving a second search term;
determining that a response to a partial match of the second search term is stored in memory, the response to the partial match of the second search term comprising a second plurality of distinct values;
sending, based on a number of distinct values in the second plurality of distinct values meeting the size threshold, a request comprising the second search term; and
receiving, in response to the request, a third plurality of distinct values having a greatest frequency in the data set and responsive to the second search term.

20. The computer program product of claim 15, wherein the steps further comprise:
receiving a selection of a second value from the first plurality of distinct values,
wherein filtering, based on the first selected value, the worksheet comprises filtering, based on the selected first value and the selected second value, the worksheet.

* * * * *